United States Patent [19]
Henoch

[11] 3,810,004
[45] May 7, 1974

[54] DEVICE FOR CONTINUOUS MEASUREMENT AND/OR MONITORING OF A DIMENSION OF AN OBJECT OF LARGE LONGITUDINAL DIMENSION

[75] Inventor: Bengt Henoch, Skarholmen, Sweden

[73] Assignee: Institutet for Mikrovagsteknik, Stockholm, Sweden

[22] Filed: July 6, 1972

[21] Appl. No.: 269,439

[30] Foreign Application Priority Data
July 6, 1971 Sweden.................... 8725/71

[52] U.S. Cl. ............................................ 324/58.5 R
[51] Int. Cl. ............................................ G01n 27/04
[58] Field of Search ..... 324/58.5 R, 58.5 A, 58.5 B, 324/58.5 C

[56] References Cited
UNITED STATES PATENTS
3,551,806  12/1970  Sasaki ........................ 324/58.5 A
3,508,145   4/1970  Reed et al.................... 324/58.5 A
3,628,135  12/1971  Reed............................ 324/58.5 A Primary Examiner—Alfred E. Smith
Attorney, Agent, or Firm—Burns, Doane, Swecker & Mathis

[57] ABSTRACT

A device for the continuous measurement and/or monitoring of a dimension of an object of large longitudinal dimension. The device is of the kind which comprises a source of high-frequency electrical energy for the supply of energy of a frequency which varies periodically within a certain frequency range, a microwave circuit connected to this source of energy, which circuit in the presence of the said objects transmits frequency dependent energy within the said frequency range, and an indicator circuit for the indication of the dimension of the object as a function of the energy transmission through the microwave circuit.

8 Claims, 6 Drawing Figures

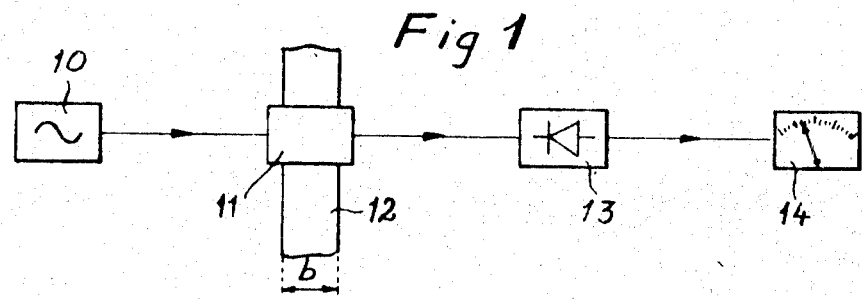
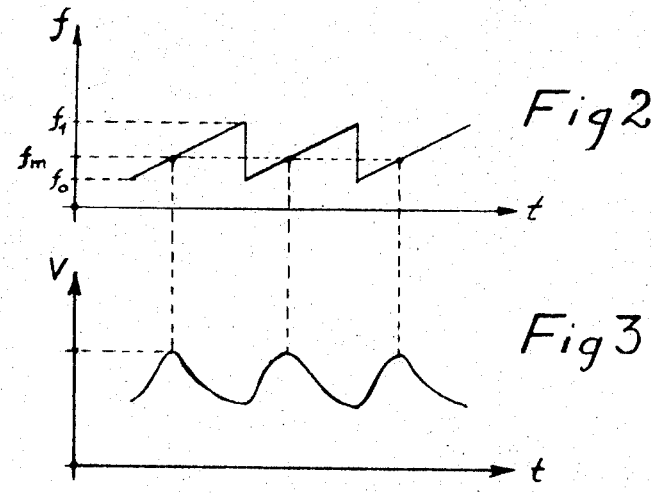
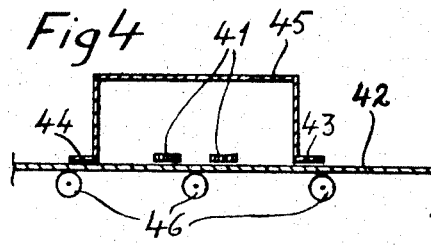
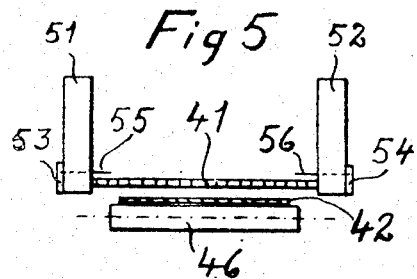
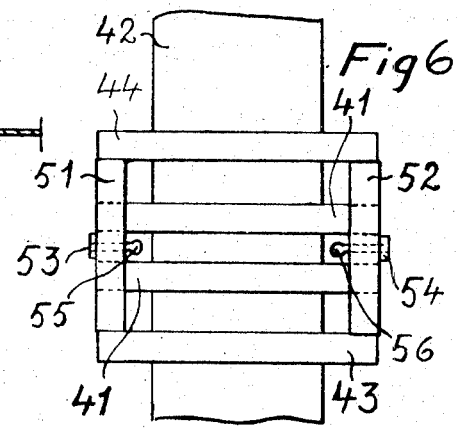

DEVICE FOR CONTINUOUS MEASUREMENT AND/OR MONITORING OF A DIMENSION OF AN OBJECT OF LARGE LONGITUDINAL DIMENSION

The aim of the invention is to provide a device which is easy to operate and reliable for measurement and monitoring in conjunction with manufacturing processes for steel strip, sheet steel or steel plate etc. The characteristic features of a device in accordance with the invention are specified in the attached patent claims.

The invention will be described in greater detail in conjunction with the attached drawing, in which FIG. 1 shows diagrammatically the units comprised in the device in accordance with the invention, FIGS. 2 and 3 show diagrams in order to further illustrate how the device according to FIG. 1 operates, and FIGS. 4, 5 and 6 show three different views of one version of a device for measuring the width of a strip-shaped steel object of large longitudinal dimension.

The device according to FIG. 1 comprises an oscillator 10 which emits high-frequency electrical energy, the frequency of which varies periodically according to FIG. 2, a unit 11 which contains a transmission line under which a strip-shaped object of large longitudinal dimension 12, e.g. a steel strip, is to pass, and a detector 13 which is integral with an indicator circuit 14 which indicates the width $b$ of the object 12 of large longitudinal dimension. The high-frequency energy emitted by the oscillator 10 is fed through a loop into the transmission line which is non-reflectively terminated by means of two disc attenuators. By virtue of this arrangement, provided that the strip-shaped object of large longitudinal dimension is not in the vicinity of the transmission line, all the high-frequency energy which is fed into the transmission line will be detected in the detector 13 after its output through a loop, while, on the other hand, if the object of large longitudinal dimension is caused to pass underneath the transmission line, the characteristic impedance of that part of the transmission line under which the object passes will undergo a substantial change. Owing to the change in the characteristic impedance, part of the high-frequency energy which is fed into the transmission line will be reflected at the points along the line where the characteristic impedance has been changed by the presence of the object. These reflections are compounded and produce a resultant reflection and associated transmission which are frequency dependent, as will be seen from FIGS. 2 and 3, this process being governed by the length of that part of the transmission line in which the characteristic impedance has been changed, i.e., the width $b$ of the object. FIG. 2 shows how the frequency $f$ of the high-frequency energy varies periodically with time $t$, and FIG. 3 shows how the voltage V across the detector 13 i.e., the transmission through the line, varies with the frequency variation of the high-frequency energy.

The said voltage V has a maximum, see FIG. 3, at a frequency $f_m$ corresponding to a wave length $\lambda$ of the electromagnetic wave which is propagated along the transmission line. This wave length can be related to the required dimension $b$, i.e., the width of the strip-shaped object 12 of large longitudinal dimension, according to the formula $$b = n\lambda/2$$

where $n$ is an integer.

In the indicator circuit 14 beyond the detector, the voltage V is processed in a known manner so that a signal is generated which provides a direct measure of the frequency $f_m$ and therefore also of the required quantity $b$. The indicator circuit 14 has a unit constructed and calibrated in such a way that it provides a reading, e.g., in cm, of the width of the object (steel plate or sheet steel).

FIG. 4 shows diagrammatically a view of one side of part of a device in accordance with the invention for measurements on a steel strip 42 which is conveyed along on a roller track 46. The transmission line comprises two metal bars 41 situated on the same side of the steel strip 42 and at right angles to it. The bars are attached to two disc attenuators (not shown in FIG. 4) which terminate the transmission line. Over the bars (and the disc attenuators) there is placed a hood (43–45–44), the function of which is to provide mechanical protection for the bars (disc attenuators) and the input and output loops for the electrical energy, and also electrical screening of the transmission line, and to form an earth for the electrical system. The hood is flared out at its ends so that two metal planes 43 and 44, are formed parallel to the steel strip 42. The duty of these metal planes is to attenuate the electromagnetic waves which spread out in the longitudinal direction of the steel strip and which are excited by the TEM wave propagated along the bars 41 (the transmission line), whereby the measurement accuracy is appreciably improved.

FIG. 5 shows a front view of the device according to FIG. 4 but with the hood 43–45–44 removed. Fixing of the bars 41 in the disc attenuators, denoted 51 and 52, may be seen. On the outside of the disc attenuator 51 there is a junction box 53 containing electrical connection for an input loop 55 for the input of electrical energy to the bars 41, and on the outside of the disc attenuator 52 there is a junction box 54 containing electrical connection for an output loop 56 for the input of signals to the detection circuit-indicator circuit.

FIG. 6 shows the device according to FIGS. 4–5 from above but with part 45 of the hood removed.

The device described in the foregoing is best suited for the measurement of the width, in the order of 100–1,000 mm, of panel-shaped metallic objects. It is not, however, confined to such objects but can also be used for measurements on other objects which have the property of being able to affect the characteristic impedance of a transmission line.

It has been assumed that the device shown will provide indication of the required dimension when energy transmission through the transmission line is a maximum. The indicator circuit can however be calibrated so as to show the required dimension when energy transmission is a minimum, in which case the dimension is obtained as an odd number of quarter wave lengths. Other functional relations are also possible between the required dimension and the frequency dependent transmission of energy, e.g., the difference of the frequencies at maximum and minimum transmissions of energy.

I claim:

1. Device for the continuous measurement of a dimension of an object of large longitudinal dimension, which comprises:
   a source of high-frequency electrical energy for the supply of energy of a frequency which varies periodically within a certain frequency range,
   a microwave circuit connected to said source of energy, which circuit in the presence of said objects transmits frequency dependent energy within said frequency range,
   an indicator circuit for the indication of the dimension of the object as a function of the energy transmission through the microwave circuit, which microwave unit consists of a transmission line which is non-reflectively terminated for energy within said frequency range at both its ends, and said transmission line, during measurement, is placed near the object and substantially at right angles to the longitudinal direction of the object of large longitudinal dimension, so that the dimension of the object which is to be measured is covered by the transmission line along a distance corresponding to said dimension, in such a way that the transmission line along said distance is given a characteristic impedance which is substantially different from the characteristic impedance of the remainder of the transmission line, and the indicator circuit is designed to indicate the required dimension as a function of the frequency of the maximum energy transmission through the transmission line corresponding to said distance as a number of half wave lengths, or the frequency of the minimum energy transmission corresponding to said distance as an odd number of quarter wave lengths, or the difference of the frequencies of the maximum and minimum energy transmissions,
   wherein the transmission line comprises two metal bars situated on the same side of, and at right angles to, the objects of large longitudinal dimension to be measured, and in other respects is constructed such as to render it possible for a transverse electromagnetic wave to be propagated.

2. Device as defined in claim 1, wherein connected to the transmission line and above the object of large longitudinal dimension to be measured there are situated metal planes with outward-bent portions at right angles to the object, thereby preventing propagation of electromagnetic waves along the object of large longitudinal dimension.

3. Device as defined in claim 1, wherein connected to the transmission line and below the object of large longitudinal dimension to be measured there are situated metal planes with outward-bent portions at right angles to the object, thereby preventing propagation of electromagnetic waves along the object of large longitudinal dimension.

4. Device for the continuous measurement of a dimension of an object of large longitudinal dimension, which comprises:
   a source of high frequency microwave electrical energy for the supply of energy at a frequency which varies periodically within a certain frequency range,
   a microwave circuit connected to said source of energy, which circuit in the presence of said object transmits frequency dependent energy within said frequency range, the microwave circuit comprising a transmission line which is non-reflectively terminated for energy within said frequency range, said transmission line being located near the object and oriented so that the dimension of the object which is to be measured is covered by the transmission line along a distance corresponding to said dimension in such a way that the transmission line along said distance is given a characteristic impedance which is substantially different from the characteristic impedance of the remainder of the transmission line, and
   an indicator circuit for the indication of the dimension of the object as a function of the frequency of the energy transmission through the microwave circuit that has a predetermined value.

5. Device as defined in claim 4 wherein the indicator circuit produces an indication of the required dimension as a function of the frequency of the maximum energy transmission through the transmission line corresponding to said distance as a number of half-wave lengths.

6. Device as defined in claim 4 wherein the indicator circuit produces an indication of the required dimension as a function of the frequency of the minimum energy transmission corresponding to said distance as an odd number of quarter-wave lengths.

7. Device as defined in claim 4 wherein the indicator circuit provides an indication of the required dimension as a function of the difference of the frequencies of the maximum and minimum energy transmission.

8. A method for the continuous measurement of a dimension of an object of large longitudinal dimension which comprises:
   providing a source of high frequency electrical energy connected to a transmission line which is terminated in a non-reflecting manner;
   periodically varying the frequency within a predetermined frequency range of the electrical energy;
   locating an object having a dimension to be measured adjacent a portion of said transmission line so that the characteristic impedance of the transmission line along said portion is different from the characteristic impedance of the remainder of the transmission line whereby the reactive component of said characteristic impedance is varied in accordance with the dimension of said object;
   moving said object in a direction substantially perpendicular to the length of said transmission line to thereby vary the characterisitc impedance of the transmission line in accordance with any variation in the object dimension as measured in a direction along the length of the transmission line; and
   indicating the dimension of the object as a function of the frequency of the transmitted energy that has a predetermined value.

* * * * *